Figure 1:
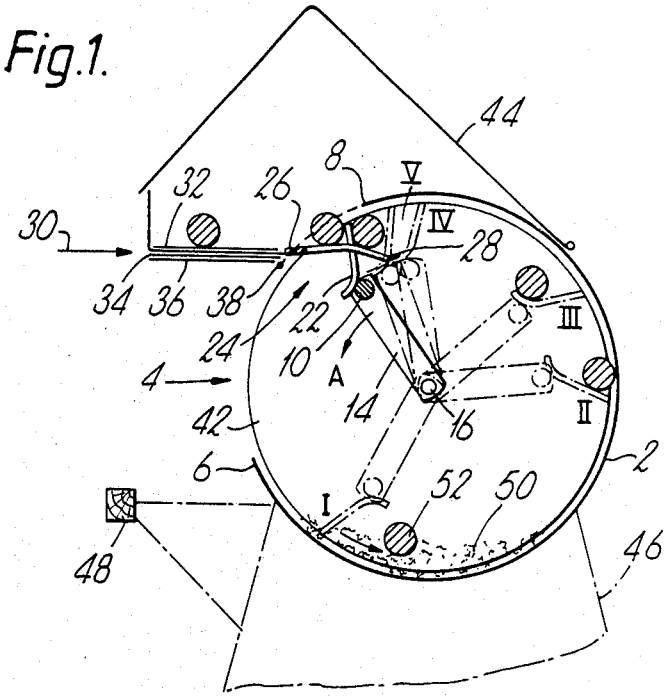

United States Patent [19]

Cassuto

[11] Patent Number: 4,791,884
[45] Date of Patent: Dec. 20, 1988

[54] LAYING NEST FOR DOMESTIC FOWL AND METHOD FOR COLLECTING EGGS

[76] Inventor: Daniel Cassuto, Mobile Post, Jerusalem Hills, Village Ofrah, Israel, 90906

[21] Appl. No.: 54,914

[22] Filed: May 28, 1987

[30] Foreign Application Priority Data

Jun. 10, 1986 [IL] Israel .................................. 79074

[51] Int. Cl.$^4$ ............................................. A01K 31/16
[52] U.S. Cl. ............................................. 119/48
[58] Field of Search ............................... 119/45 R, 48

[56] References Cited

U.S. PATENT DOCUMENTS

| | | | |
|---|---|---|---|
| 946,323 | 1/1910 | Boettcher | 119/48 X |
| 1,221,540 | 4/1917 | Jones | 119/48 |
| 1,448,544 | 3/1923 | Jesse | 119/45 R |
| 2,049,121 | 7/1936 | Johnson | 119/48 |
| 3,139,065 | 6/1964 | Willauer | 119/45 R |
| 4,381,732 | 5/1983 | Huisinga | 119/48 X |

*Primary Examiner*—Robert P. Swiatek
*Assistant Examiner*—J. Marie Britt
*Attorney, Agent, or Firm*—Pollock, VandeSande and Priddy

[57] ABSTRACT

The invention provides a laying nest for domestic fowl with automatic egg collection. The nest includes a housing consisting of a substantially horizontal, at least in part substantially cylindrical drum-like structure provided with a window-like opening extending at least along a portion of its length, a rotatable rake-like member provided with a tine portion comprised of a plurality of tines and located inside the housing in substantially parallel, but eccentric relationship with the axis thereof, the tine portion, when rotating, sweeping out a layer of the housing interior corresponding in depth to the length of the tines, and a counter-rake attached to the housing and having a tine portion comprised of a plurality of inwards-pointing tines, the counter-rake tine portion penetrating the path of sweep of the rotating tine portion. A method for collecting eggs in an automatic laying nest is also described.

11 Claims, 1 Drawing Sheet

LAYING NEST FOR DOMESTIC FOWL AND METHOD FOR COLLECTING EGGS

The present invention relates to a laying nest with automatic egg collection for domestic fowl, especially for breeding flocks. It also relates to a method for collecting eggs in an automatic laying nest.

To constitute an economical proposition, laying nests with automatic egg collection or, for short, automatic nests, must fulfill several conditions: They must be relatively inexpensive, safe for both the birds and the eggs, as well as simple and cheap to operate.

Automatic nests are known. In one of them, there is provided an ejector member to which is hinged an egg-removing member. The former, in the forward part of a reciprocating stroke, drives out the hen from the cell, while the latter, on the return stroke, engages the egg—if an egg was laid—and drags it along the padding onto a conveyor belt. This device suffer from several disadvantages. The reciprocating stroke of the above-mentioned members is effected by a pneumatic cylinder, the acceleration and speed of which are notoriously difficult to control and the hem might find itself not pushed out, but literally kicked out of the cell. The effect on the egg, of sudden jerks in the pneumatic-piston movement is quite obvious. Also, as the cylinder is automatically timed, a hen is as likely as not to find itself evicted before having had the opportunity to lay its egg, a frustrating experience the effect of which on egg production merits further investigation. Another disadvantage of this and similar prior-art devices resides in the fact that the hen being pushed out through the front door, as well as the egg being shoved out through the back door, inevitably drag along some of the essential padding, such as artificial grass or the like, which must therefore be frequently replenished, a procedure that, being time-consuming, causes added costs.

It is one of the objects of the present invention to overcome the disadvantages and drawbacks of the prior-art nests and to provide an automatic nest that is relatively inexpensive in capital outlay as well as in operation, and that is safe for both the birds and the eggs.

This the invention achieves by providing a laying nest for domestic fowl with automatic egg collection, comprising:

a housing consisting of a substantially horizontal, at least in part substantially cylindrical drum-like structure provided with a window-like opening extending at least along a portion of its length;

a rotatable rake-like member provided with a tine portion comprised of a plurality of tines and located inside said housing in substantially parallel, but eccentric relationship with the axis thereof, said tine portion, when rotating, sweeping out a layer of the housing interior corresponding in depth to the length of said tines, and, a counter-rake attached to said housing and having a tine portion comprised of a plurality of inwards-pointing tines, said counter-rake tine portion penetrating the path of sweep of said rotating tine portion.

In another aspect of the invention there is provided a method for collecting eggs in an automatic laying nest, comprising the steps of:

providing an automatic laying nest comprising a sutstantially horizontal, substantially cylindrical housing having a window-like opening extending therealong, a rotatable rake-like member provided with a plurality of tines and located inside said housing in substantially parallel, but eccentric relationship with the aixs thereof, a counter-rake attached to said housing, and an egg-unloading surface extending therealong;

rotating said rake-like member;

scooping up from the bottom region of said housing any eggs laid, using the tines of said rotating rake-like member;

lifting the scooped-up eggs to a higher region of said housing, and depositing said eggs on said counter-rake, to roll onto said egg-unloading surface.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 2:
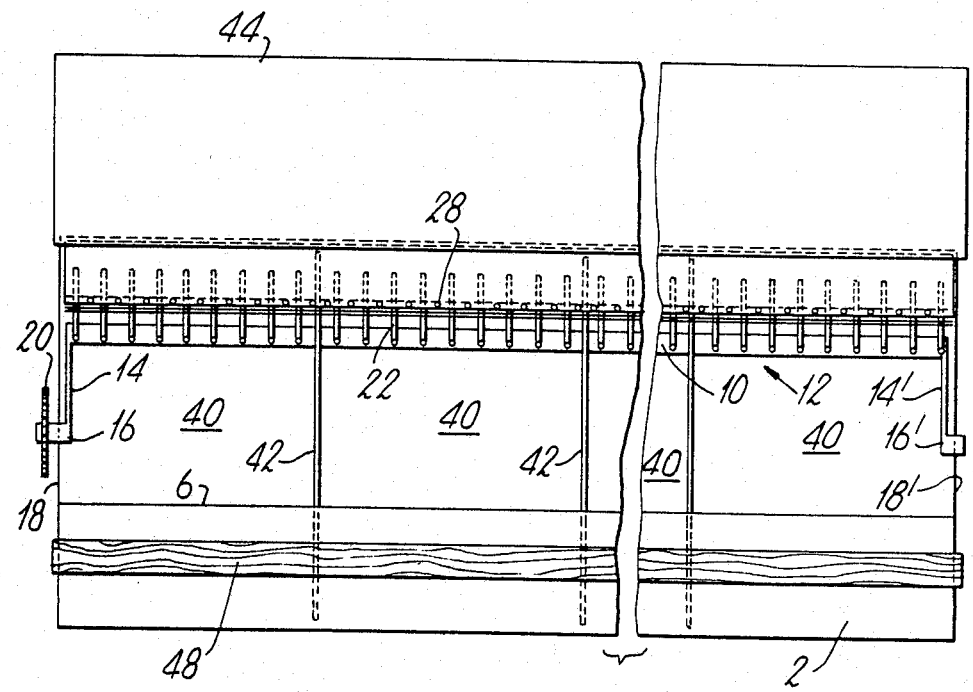

In the drawings:

FIG. 1 is a schematic cross section of the automatic nest according to the invention, and FIG. 2 is a front view thereof.

Referring now to the drawings, there is seen in FIGS. 1 and 2 a cylindrical, drum-like housing 2 closed at both ends and provided with a window-like opening 4 extending horizontally along the entire length of the housing 2, and vertically between a lower edge 6 and an upper edge 8.

Inside the housing 2 there is seen a crank-like arrangement comprising, as crank pin, the bar portion 10 of a rake 12; as crank webs, two arms 14, 14', and a crank journals, two stub shafts 16, 16' rotatably mounted in the end plates 18, 18' of the housing 2. To one of the stub shafts, 16, is keyed a wheel 20 connectable by means of a chain or similar drive to a source of rotary power such as, e.g., an electric motor, both of which components are not shown.

The rake 12 is provided with a tine portion comprised of a plurality of finger-like tines 22 attached, e.g., by welding, to the bar portion 10 and extending towards the cylindrical inside surface of the housing 2 without, however, touching it. It is also seen that while the main portion of the tines 22 is substantailly straight, the portion close to the point of attachment to the bar 10 is bent for a purpose to be explained further below.

It is obvious that when the chain wheel 20 is set in motion, the rake 12 will start rotating inside the housing 2, the motor being rigged in such a way that the sense of rotation of the rake will be that indicated by arrow A. While the advantage of this sense of rotation is obvious, an embodiment can be envisaged in which the rake 12 may rotate in the opposite sense. It is equally obvious that with the rake 12 thus rotating, the tines 22 thereof will "sweep out" a layer of the housing interior that corresponds in depth to the length of the tines 22.

There is further seen a counter-rake 24 which is stationary and is comprised of a slightly outwardly and downwardly inclined bar portion 26 fixedly attached at its ends to the housing 2, and a tine portion consisting of a plurality of tines 28. As seen from their end points inside the housing 2, these stationary tines 28 at first rise upwards up to about half the width of the rake 24, where they form a "hump", beyond which they slant downwards at about the same angle of incline as that of the bar portion 26.

These stationary tines 28 are seen to penetrate the path of sweep of the rotating tines 22, the arrangement being such that the individual tines 22 of the rotating rake 12 can pass freely between the individual tines 28 of the stationary rake 24.

Outside of the housing 2, at about the level of the stationary rake 24, there is arranged a conveyer belt 30, of which there are schematically indicated the upper, active portion 32 and the lower, return portion 34. The belt 30 extends at least along the entire length of the window-like opening 4, where a chute or another belt can take over, leading to a collection point.

Also seen is a flap door 36 attached to the housing 2 by means of a hinge 38 and which, when lowered, closes off a substantial proportion of the opening 4. With the flap door 36 lowered, the hens—which in breeding flocks must be kept on the ground except for the actual period of laying, in order to be available to the rooster—can no longer enter the nest. However, hens inside the nest when the flap door 36 is lowered, can open it from the inside to get out. The position of the door can be controlled, e.g., by cables.

The housing interior is subdivided into separate cells 40 by means of partition walls 42. These walls are circular disks of a diameter somewhat smaller than the inside diameter of the housing 2. They are fixedly and eccentrically attached to the bar portion 10 of the rotary rake 12 in such a way and at such a distance from their centers that, when rotating together with the rake 12 (as they will, being connected to them), they will do so in a concentric relationship with the housing wall.

The conveyor 30 as well as that part of the opening 4 which extends from the upper edge 8 to the conveyor surface 32 is protected by a hood 44 hingedly attached to the housing 2.

Also provided is a schematically indicated stand 46 including a perch 48 onto which the hens jump before entering the cells 40.

The electric motor mentioned above is connected to a timer which actuates it at predeterminable time intervals and for a limited number of turns of the rotary rake 12, say one or two. Also provided is a microswitch arrangement, per se known and not shown in the drawings, whereby the rake 12, having carried out its turn or turns, it made to stop at or near its topmost position, so as not to interfere, while resting, with the entry, into the cells 40, of the hens.

In operation, the automatic nest according to the invention functions as follows:

The hen, having entered a cell 40, turns about to face the opening 4, sits down on the padding 50 which, advantageously, consists of saw dust or sand, and lays its egg 52, shown in transversal cross section, in which it obviously appears as of circular shape. Depending on the state of the timer, the rake 12 will eventually start moving downwards from its upper position of rest. The hens, as has been found, are not at all perturbed by the rake slowly moving downwards and towards them, and simply step over it. When any of the tines 22, several progressive positions I, II, III, IV and V of which are indicated by dashed lines, encounter an egg 52, they scoop it up and lift it along the interior wall of the housing. It is immediately seen that whenever quantity of padding is entrained by the tines 22 and/or by the egg 52 is not pushed out through the window-like opening 4, but is at worst lifted up for some distance, to eventually drop back onto the padding bed. It is also seen that somewhere between positions II and III the inclination of the tines 22 passes the horizontal and the egg, which up to this point touches the housing wall, is now rolling back, yet is prevented form falling off the tines 22 by the already mentioned bent end portion of the rotary tines 22, as clearly seen in position III. (The same effect could obviously be attained by a separate abutment member). At positions IV and V the egg already rests on the stationary tines 28 and is pushed up the incline of their first portion. In the final position of the rake 12 and its tines 22, drawn in solid lines, the egg has been pushed beyond the "hump" and is about to roll onto the conveyer belt surface 32.

While in the embodiment shown the rotary rake 12 is driven from one side only (the chain wheel 20 on the left), such a method of drive when used in housing of greater length may introduce undesirable skewing forces in the rake 12, which can be avoided by providing a chain wheel also for the journal 16' on the right, both chain wheels to be driven, in a manner as such known, by the same motor. In even longer housings it might be necessary to support the rake bar 10 at one or more points. This can be done by subdividing the rake 12 and providing at each point of support a partition fixed to the housing wall and carrying an intermediate journal 16, to which an arm 14 is connected on each side of the fixed partition.

It should be noted that for purpose of this specification the term "crank-like arrangement" is to be understood as referring to any mechanical arrangement whereby an elongated member is enabled to perform a rotary movement about a physical or geometrical axis parallel to, but distant from, itself.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A laying nest for domestic fowl with automatic egg collection, comprising:
 a housing consisting of a substantially horizontal, at least in part substantially cylindrical drum-like structure provided with a window-like opening extending at least along a portion of its length;
 a rotatable rake located within said housing and mounted for rotation through at least 360° about an axis which is substantially concentric with the axis of said substantially cylindrical drum-like structure, said rake being provided with a tine portion comprised of a plurality of tines that are disposed along a line substantially parallel to but spaced from the axis of rotation of said rake, said tine portion, when said rake is rotating, sweeping out a layer of the housing interior corresponding in depth to the length of said tines, and, a stationary counter-rake attached to said housing and having a tine portion comprised of a plurality of inwards-pointing tines, said counter-rake tine portion penetrating the path of sweep of said rotating tine portion.

2. The laying nest as claimed in claim 1 further comprising timer means to actuate said rotating rake as predeterminable intervals for at least one full turn, and switch means for stopping said rake after said turn or turns in a rake position which is at or near the topmost position of said rotatable rake.

3. The laying nest as claimed in claim 1 further comprising a lowerable flap door hinged to said housing, said flap door, in its lowered position, closing off at least part of the height of said window-like opening, the hinge of said flap door being arranged to prevent fowl from entering said housing while permitting fowl inside said housing to leave said housing when said flap door is in its lowered position.

4. The laying nest as claimed in claim 1 further comprising one or more partition walls dividing said drum into a number of separate cells, said partition walls being circular disks of a diameter slightly smaller than the inside diameter of said housing, said circular disks being concentric with respect to said housing and being eccentrically and fixedly attached to said rotating rake bar for rotation together with said rake bar.

5. The laying nest of claim 1 wherein said stationary counter-rake is attached to said housing at a location thereon which is higher than the axis of rotation of said rotatable rake.

6. A laying nest for domestic fowl with automatic egg collection, comprising:

a housing consisting of a substantially horizontal, at least in part substantially cylindrical drum-like structure closed at both ends and provided with a window-like opening extending at least along a portion of its length;

a crank arrangement comprising at least one bar-like crank member located inside said housing in substantially parallel, but eccentric, relationship with the axis of said cylindrical drum-like structure, said crank member being connected by at least two crank webs to at least two crank journals rotatably mounted in said housing and substantially coaxial therewith, at least one of said crank journals being connectable to a source of rotary power and, via said crank webs, being adapted to cause said crank member to rotate through at least 360° about the axis of said housing, said crank member constituting the bar portion of a rotatable rake provided with tine portion comprised of a plurality of finger-like first tines extending towards, and ending in proximity of, the cylindrical inside surface of said housing, said tine portion rotating with said crank member and, when rotating, passing along a circular path concentric with the axis of said cylindrical inside surface to sweep out a layer of the housing interior corresponding in depth to the length of said first tines;

a stationary counter-rake having an outwardly extending bar portion attached at its ends to said housing and a further tine portion attached to said bar portion and comprised of a plurality of inwards-pointing stationary second tines, said counter-rake tine portion penetrating the path of sweep of said rotating tine portion, and an egg-unloading surface disposed adjacent said stationary counter-rake and extending at least along the entire length of said window-like opening.

7. The laying nest as claimed in claim 6 wherein said egg-unloading surface is the upper side of a belt conveyer.

8. The laying nest of claim 6 wherein said stationary counter-rake and said egg-unloading surface are located at positions that are higher than the axis of said cylindrical inside surface of said housing.

9. A method for collecting eggs in an automatic laying nest, comprising the steps of:

providing an automatic laying nest comprising a substantially horizontal, substantially cylindrical housing having a window-like opening extending therealong, a rotatable rake-like member provided with a plurality of tines and located inside said housing in substantially parallel, but eccentric relationship with the axis thereof, a stationary counter-rake attached to said housing, and an egg-unloading surface extending along said stationary counter-rake;

rotating said rake-like member for at least one full turn;

scooping up from the bottom region of said housing any eggs laid, using the tines of said rotating rake-like member;

lifting the scooped-up eggs to a higher region of said housing, and depositing said eggs on said stationary counter-rake, to roll from said counter-rake onto said egg-unloading surface.

10. The method as claimed in claim 9 comprising the further step of conveying said unloaded eggs to a collection point.

11. The method of claim 9 wherein said eggs are deposited on said stationary counter-rake at a location in said housing that is higher than the axis of rotation of said rake-like member.

* * * * *